(12) United States Patent
Winkelmann et al.

(10) Patent No.: US 11,958,598 B2
(45) Date of Patent: Apr. 16, 2024

(54) WING FOR AN AIRCRAFT

(71) Applicant: Airbus Operations GmbH, Hamburg (DE)

(72) Inventors: Christoph Winkelmann, Buchholz (DE); Bernhard Schlipf, Bremen (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 53 days.

(21) Appl. No.: 17/716,705

(22) Filed: Apr. 8, 2022

(65) Prior Publication Data
US 2022/0324548 A1   Oct. 13, 2022

(30) Foreign Application Priority Data

Apr. 13, 2021   (EP) ..................................... 21168211

(51) Int. Cl.
| *B64C 3/28* | (2006.01) |
| *B64C 9/02* | (2006.01) |
| *B64C 9/04* | (2006.01) |
| *B64C 13/30* | (2006.01) |
| *B64C 13/34* | (2006.01) |

(52) U.S. Cl.
CPC ................. *B64C 3/28* (2013.01); *B64C 9/02* (2013.01); *B64C 9/04* (2013.01); *B64C 13/30* (2013.01); *B64C 13/34* (2013.01)

(58) Field of Classification Search
CPC   B64C 3/28; B64C 13/24; B64C 13/26; B64C 13/28; B64C 13/30; B64C 13/34; B64C 13/341; B64C 9/02; B64C 9/04
See application file for complete search history.

(56) References Cited

U.S. PATENT DOCUMENTS

| 4,470,569 A * | 9/1984 | Shaffer ..................... B64C 9/22 244/214 |
| 7,048,234 B2 * | 5/2006 | Recksiek ........... B64D 45/0005 244/75.1 |
| 2019/0193837 A1 * | 6/2019 | Schlipf ................... B64C 13/28 |

FOREIGN PATENT DOCUMENTS

| EP | 2 202 146 | 6/2010 |
| EP | 3 378 760 | 9/2018 |

(Continued)

OTHER PUBLICATIONS

Extended European Search Report for Application No. EP 21168211.7, seven pages, dated Sep. 27, 2021.

*Primary Examiner* — Philip J Bonzell
*Assistant Examiner* — Colin Zohoori
(74) *Attorney, Agent, or Firm* — Nixon & Vanderhye P.C.

(57) ABSTRACT

A wing for an aircraft is disclosed including a main wing, a leading edge high lift assembly having a leading edge high lift body, and a connection assembly movably connecting the leading edge high lift body to the main wing, wherein the connection assembly includes a drive system that is mounted to the main wing and connected to the leading edge high lift body for driving the leading edge high lift body between the retracted position and the extended position. The drive system includes a first drive unit and a second drive unit, the first drive unit has a first input section coupled to a drive shaft, a first gear unit and a first output section coupled to a first connection element and including a first output wheel. The second drive unit has a second input section coupled to the drive shaft, a second gear unit, and a second output section coupled to a second connection element and including a second output wheel.

18 Claims, 3 Drawing Sheets

(56) References Cited

FOREIGN PATENT DOCUMENTS

EP        3 378 762     9/2018
EP        3 501 978     6/2019

\* cited by examiner

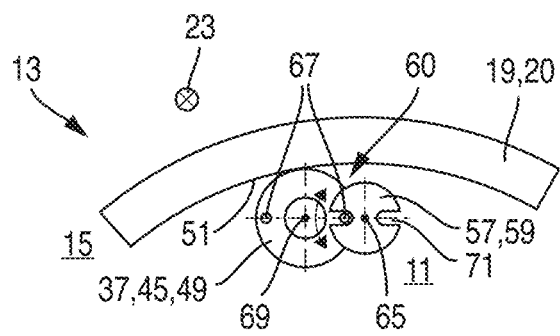
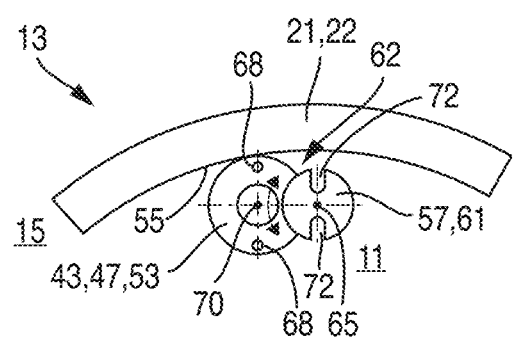
Fig. 3a　　　　　　　　　　Fig. 3b
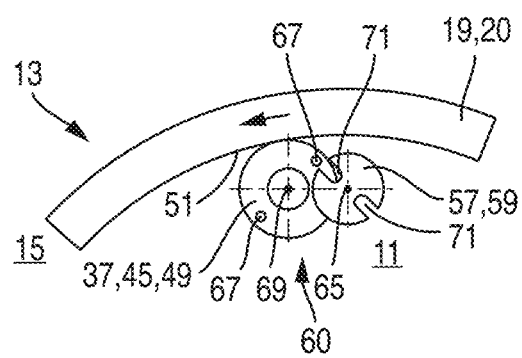
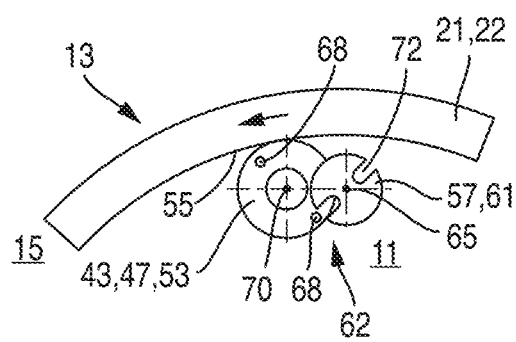
Fig. 3c　　　　　　　　　　Fig. 3d

WING FOR AN AIRCRAFT

CROSS REFERENCE TO RELATED APPLICATION

This application claims priority to and incorporates by reference the entirety of European Patent Application EP 21168211.7, filed Apr. 13, 2021.

TECHNICAL FIELD

The present invention relates to a wing for an aircraft, comprising a main wing and a leading edge high lift assembly. Further aspects of the invention relate to a leading edge high lift assembly for such a wing, as well as to an aircraft comprising such a wing and/or comprising such a leading edge high lift assembly.

BACKGROUND OF THE INVENTION

The leading edge high lift assembly comprises a leading edge high lift body, and a connection assembly for movably connecting the leading edge high lift body to the main wing, such that the leading edge high lift body can be moved relative to the main wing between a retracted position and at least one extended position. The leading edge high lift body is preferably formed as a slat or a droop nose.

The connection assembly comprises a first connection element, such as a track or a linkage, and a second connection element, such as a track or a linkage. The first connection element is movably mounted to the main wing and is mounted, preferably fixedly and/or directly mounted, to the leading edge high lift body. The second connection element is movably mounted to the main wing and is mounted, preferably fixedly and/or directly mounted, to the leading edge high lift body in a position spaced apart from the first connection element in a wing span direction.

Further, the connection assembly comprises a drive system that is provided at, preferably fixedly mounted to, the main wing and that is connected to, preferably indirectly connected to, the leading edge high lift body for driving, i.e. initiating movement, of the leading edge high lift body between the retracted position and the extended position. The drive system comprises a first drive unit and a second drive unit spaced apart from one another in the wing span direction. The first drive unit is preferably formed as a geared rotary actuator (GRA) and has a first input section coupled to a drive shaft, a first gear unit, and a first output section drivingly coupled to the first connection element. The second drive unit is preferably formed as a geared rotary actuator (GRA) and has a second input section coupled to the drive shaft, a second gear unit, and a second output section drivingly coupled to the second connection element. The first and second gear units preferably transform high rotational speed with low torque from the first and second input sections, i.e. from the drive shaft, into low rotational speed with high torque at the first and second output sections. The first output section comprises a first output wheel and the second output section comprises a second output wheel. First and second output wheels are preferably formed as pinions.

Such wings are known in the art. For the wings known in the art, skew cases are possible, where the first and second connection elements or the first and second drive units do not move in sync and the leading edge high lift body might be skewed about a vertical axis.

SUMMARY

The invention contemplates preventing such skew cases of the leading edge high lift body.

The invention contemplates a drive system comprising a sync arrangement coupling the first output section to the second output section for sync movement of the first and second output sections. The sync arrangement comprises a first sync wheel, a second sync wheel, and a sync shaft fixedly, i.e. in a torque-proof manner, in particular rigidly, connecting the first sync wheel to the second sync wheel, preferably such that the sync shaft extends coaxially with a sync axis about which the first and second sync wheels as well as the sync shaft rotate. The first sync wheel is configured to be driven by the first output wheel and the second sync wheel is configured to be driven by the second output wheel. The first sync wheel may be configured to engage the first output wheel, may be in a toothed manner, to be directly driven by the first output wheel, and the second sync wheel is configured to engage the second output wheel, may be in a toothed manner, to be directly driven by the second output wheel.

Alternatively, the first sync wheel might also be configured to be indirectly driven by the first output wheel via one or more additional elements, and the second sync wheel might be configured to be indirectly driven by the second output wheel via one or more additional elements. Such an additional element might be for example a track, so that the first output wheel engages a first track, e.g. in a way of a rack and pinion drive, while the first track is engaged by the first sync wheel, e.g. in a way of a stepping engagement where projections, preferably pins, provided at the first track engage with corresponding recesses, preferably slots, provided at the first sync wheel, and so that the second output wheel engages a second track, e.g. in a way of a rack and pinion drive, while the second track is engaged by the second sync wheel, e.g. in a way of a stepping engagement where projections, preferably pins, provided at the second track engage with corresponding recesses, preferably slots, provided at the second sync wheel.

By such a sync arrangement skew cases of the leading edge high lift body can be efficiently prevented.

According to an exemplary embodiment, the first sync wheel is configured to engage, may meshingly engage, the first output wheel and the second sync wheel is configured to engage, may meshingly engage, the second output wheel, when the first and second output wheels rotate synchronously. The engagement between the first sync wheel and the first output wheel and/or between the second sync wheel and the second output wheel does not necessarily be continuous engagement but might also be intermittent, i.e. periodical or stepwise engagement during rotation of the first output wheel and the second output wheel, respectively. For the periodical or stepwise engagement, the engagement between the first sync wheel and the first output wheel does not necessarily be simultaneous with the engagement between the second sync wheel and the second output wheel but might also be alternating. Further, the first sync wheel is preferably configured to disengage from, i.e. preferably not mesh with, the first output wheel and/or the second sync wheel is preferably configured to disengaged from, i.e. preferably not mesh with, the second output wheel, when the first and second output wheels rotate asynchronously. Preferably, this lack of proper meshing engagement causes a blockage of the respective first or second output wheel which can be detected e.g. by a torque limiter device that may stop rotation of both first and second output wheels and/or shut off the drive system. In such a way, undesired skew cases of the high lift leading edge body can be efficiently detected and avoided.

According to a further exemplary embodiment, the drive system is configured such that alternatingly a) the first sync wheel is engaged, may be meshingly engaged, and rotated by the first output wheel by a predefined angular range and b) the second sync wheel is engaged, may be meshingly engaged, and rotated by the second output wheel by the predefined angular range, when the first and second output wheels rotate synchronously. By such an alternating engagement asynchronous rotation of the first and second output wheels can be detected and addressed very efficiently.

In particular, the predefined angular range may be between 80° and 100°, may be between 85° and 95°, or may be 90°. A predefined angular range of about 90° allows efficient skew detection and can be realized by a simple and reliable mechanism.

According to an exemplary embodiment, the first output wheel and the first sync wheel are formed in the way of a first stepping gear translating a continuous rotation of the first output wheel into an intermittent rotation of the first sync wheel. Additionally or alternatively, the second output wheel and the second sync wheel are formed in the way of a second stepping gear translating a continuous rotation of the second output wheel into an intermittent rotation of the second sync wheel. By such a stepping gear a simple and efficient way to realize intermittent rotation of the first and second sync wheels is provided.

In particular, the first stepping gear and/or the second stepping gear may be in the form of a Geneva drive or s Maltese cross. Such a Geneva drive relates to a simple and efficient stepping gear.

The first output wheel may comprise two projections, may be in the form of pins, projecting from an axial surface of the first output wheel may be in parallel to an axis of rotation of the first output wheel and spaced from one another by, i.e. offset by, 180° about an axis of rotation of the first output wheel. Additionally or alternatively, the second output wheel comprises two projections, preferably in the form of pins, projecting from an axial surface of the second output wheel preferably in parallel to an axis of rotation of the second output wheel and spaced from one another by, i.e. offset by, 180° about an axis of rotation of the second output wheel. This relates to a very efficient stepping gear design in the way of a Geneva drive.

Likewise, it the first sync wheel may comprise two radial recesses, which may be in the form of slots, which are spaced from one another by, i.e. offset by, 180° about an axis of rotation of the first sync wheel, and which are formed to receive, may be to meshingly engage with, the projections of the first output wheel. Additionally or alternatively, the second sync wheel comprises two radial recesses, preferably in the form of slots, which are spaced from one another by, i.e. offset by, 180° about an axis of rotation of the second sync wheel, and which are formed to receive, preferably to meshingly engage with, the projections of the second output wheel. This relates to a very efficient stepping gear design in the way of a Geneva drive.

The projections of the first output wheel may be arranged offset by 90° relative to the projections of the second output wheel, with respect to the axis of rotation of the first output wheel and/or the axis of rotation of the second output wheel. Additionally or alternatively, the recesses of the first sync wheel are arranged offset by 90° relative to the recesses of the second sync wheel, with respect to the axis of rotation of the first sync wheel and/or the axis of rotation of the second sync wheel and/or the axis of rotation of the sync shaft. This relates to a very efficient stepping gear design with alternating rotation by 90°.

The drive system may be configured such that during continuous and synchronous rotation of the first and second output wheels alternatingly a) one of the projections of the first output wheel engages one of the recesses of the first sync wheel, rotates the first sync wheel by 90°, and then disengages from the said recess of the first sync wheel, and b) one of the projections of the second output wheel engages one of the recesses of the second sync wheel, rotates the second sync wheel by 90°, and then disengages from the said recess of the second sync wheel, when the first and second output wheels rotate synchronously. Upon asynchronous rotation of the first and second output wheels a) one of the projections of the first output wheel runs against the surface of the first sync wheel without properly engaging one of the recesses of the first sync wheel, thereby blocking or obstructing rotation of the first output wheel, and/or b) one of the projections of the second output wheel runs against the surface of the second sync wheel without properly engaging one of the recesses of the second sync wheel, thereby blocking or obstructing rotation of the second output wheel. This relates to a very efficient stepping gear design with alternating rotation by 90°.

The first drive unit may comprise a first torque limiter device configured to stop rotation of the first output wheel upon detection of a fail state. Additionally or alternatively, the second drive unit comprises a second torque limiter device configured to stop rotation of the second output wheel upon detection of a fail state. By such torque limiter device destruction of the drive system due to a skewed leading edge high lift body can be avoided.

The first torque limiter device may be configured to detect a fail state when a threshold torque at the first output wheel or within the first gear unit, as preferably detected by a torque sensor, is exceeded. Additionally or alternatively, the second torque limiter device is configured to detect a fail state when a threshold torque at the second output wheel or within the second gear unit, as preferably detected by a torque sensor, is exceeded. This relates to a very simple and efficient torque limiter device.

Alternatively, the first torque limiter device may be configured to detect a fail state when a threshold transverse force at the first sync wheel or at the sync shaft, as preferably detected by a transverse force sensor, is exceeded. Additionally or alternatively, the second torque limiter device is configured to detect a fail state when a threshold transverse force at the second sync wheel or at the sync shaft, as preferably detected by a transverse force sensor, is exceeded. Preferably, the threshold transverse force relates to a force transverse to axis of rotation of sync shaft. This relates to another very simple and efficient torque limiter device.

In particular, the sync shaft may be rotatably supported at a first housing of the first drive unit and is connected to a first transverse force sensor for triggering the first torque limiter device. The first torque limiter device is arranged inside the first housing and is connected to the first transverse force sensor through the first housing. Additionally or alternatively, the sync shaft is rotatably supported at a second housing of the first drive unit and is connected to a second transverse force sensor for triggering the second torque limiter device. The second torque limiter device is arranged inside the second housing and is connected to the second transverse force sensor through the second housing. The first torque limiter and the first transverse force sensor and/or the second torque limiter and the second transverse force sensor might be formed entirely mechanically. For example, the first transverse force sensor and/or the second transverse force sensor might be formed in a way of an elastically deformable element and the first torque limiter and/or the second torque limiter might be formed in a way of a mechanical gear brake, wherein the elastically deformable element might be mechanically coupled to the gear brake e.g. by a linkage or by another mechanism, preferably reaching through the respective first and/or second housing. However, the first transverse force sensor and/or the second transverse force sensor as well as the first torque limiter and/or the second torque limiter might be formed electronically. The first drive unit and the second drive unit might be arranged symmetrically with the first and second housing preferably facing each other to save space and to provide support for the sync shaft. The sync arrangement might be arranged in its own sync housing separate from the first and second housing. This relates to a very compact, simple efficient arrangement of the torque limiter device.

According to an exemplary embodiment, the first connection element is formed as a first track that is movably guided at the main wing and that is preferably fixedly mounted to the leading edge high lift body. Preferably, the first output wheel is formed as a first pinion drivingly engaging a first toothed rack at the surface of the first track. Additionally or alternatively, the second connection element is formed as a second track that is movably guided at the main wing and that is preferably fixedly mounted to the leading edge high lift body. Preferably, the second output wheel is formed as a second pinion drivingly engaging a second toothed rack at the surface of the first track. The first track and/or the second track are preferably in the form of an elongate support beam that is movable along the direction of its elongate extension, such as a slat track. Such a rack-and-pinion drive is a very compact and efficient drive of the first and second tracks.

According to an exemplary embodiment, the first connection element is formed as a first linkage. The first linkage comprises a first drive arm preferably fixedly coupled to the first output wheel and at least one first link element rotatably coupled to the first drive arm and coupled to the leading edge high lift body. Additionally or alternatively, the second connection element is formed as a second linkage. The second linkage comprises a second drive arm preferably fixedly coupled to the second output wheel and at least one second link element rotatably coupled to the second drive arm and coupled to the leading edge high lift body.

According to an exemplary embodiment, the connection assembly comprises one or more further connection elements in the form of a track or in the form of a linkage. Preferably, the connection assembly comprises two further connection elements that are non-driven. Such further connection elements might be required or advantageous for guiding and supporting the leading edge high lift body.

A further aspect of the present invention relates to a leading edge high lift assembly for the wing according to any of the afore-described embodiments. The leading edge high lift assembly comprises a leading edge high lift body and a connection assembly for movably connecting the leading edge high lift body to a main wing, such that the leading edge high lift body can be moved between a retracted position and at least one extended position. The connection assembly comprises a first connection element and a second connection element. The first connection element is configured to be movably mounted to the main wing and is mounted to the leading edge high lift body. The second connection element is configured to be movably mounted to the main wing and is mounted to the leading edge high lift body in a position spaced apart from the first connection element in a wing span direction. The connection assembly comprises a drive system that is configured to be mounted to the main wing and that is connected to the leading edge high lift body for driving the leading edge high lift body between the retracted position and the extended position. The drive system comprises a first drive unit and a second drive unit spaced apart from one another in the wing span direction. The first drive unit has a first input section coupled to a drive shaft, a first gear unit and a first output section coupled to the first connection element. The second drive unit has a second input section coupled to the drive shaft, a second gear unit, and a second output section coupled to the second connection element. The first output section comprises a first output wheel and the second output section comprises a second output wheel. The drive system comprises a sync arrangement coupling the first output section to the second output section for sync movement of the first and second output sections. The sync arrangement comprises a first sync wheel, a second sync wheel, and a sync shaft fixedly connecting the first sync wheel to the second sync wheel. The first sync wheel is configured to engage the first output wheel and the second sync wheel is configured to engage the second output wheel. Features and effects explained further above in connection with the wing apply vis-à-vis also in case of the leading edge high lift assembly.

A further aspect of the present invention relates to an aircraft comprising a wing according to any of the afore-described embodiments and/or comprising a leading edge high lift assembly according to any of the afore-described embodiments. Features and effects explained further above in connection with the wing and with the leading edge high lift assembly apply vis-à-vis also in case of the aircraft.

BRIEF DESCRIPTION OF THE DRAWINGS

Hereinafter, a preferred embodiment of the present invention is described in more detail by means of a drawing.

DETAILED DESCRIPTION

Figure 1:
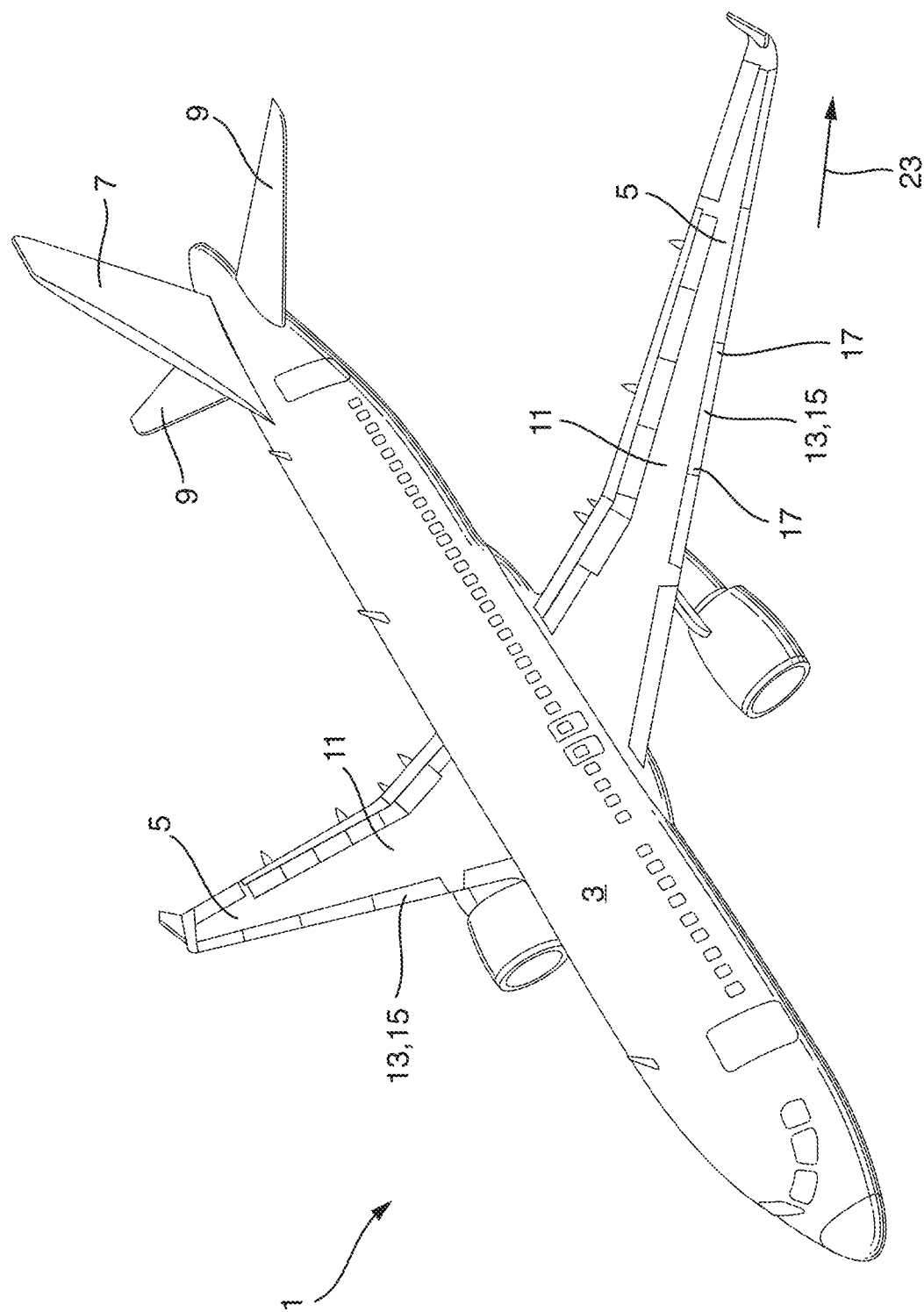
FIG. 1 is a perspective view of an aircraft according to an exemplary embodiment of the invention.
Figure 2:
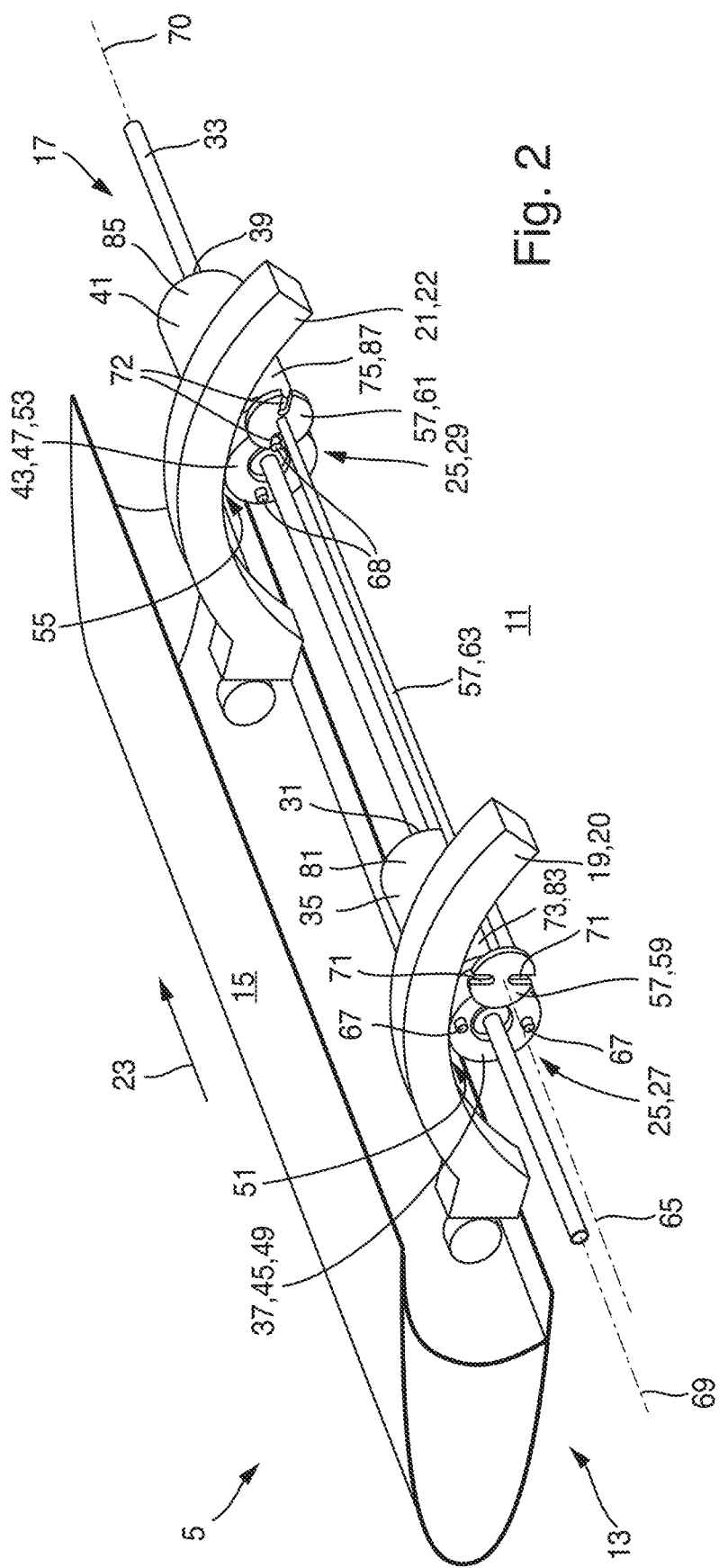
FIG. 2 is a perspective schematic view of a wing according to an exemplary embodiment of the invention; and, FIGS. 3(a) to 3(d) are four schematic side views of the first and second drive units in different states of the wing shown in FIG. 2.

In FIG. 1 an embodiment of an aircraft 1 according to the present invention is illustrated. The aircraft 1 comprises a fuselage 3, wings 5, a vertical tail plane 7 and a horizontal tail plane 9. FIGS. 2 and 3 show details of the wings 5 of the aircraft 1.

FIG. 2 shows an embodiment of the wing 5 according to the invention. The wing 5 comprises a main wing 11 and a leading edge high lift assembly 13 movable relative to the main wing 11 to increase lift of the wing 5. The leading edge high lift assembly 13 comprises a leading edge high lift body 15 and a connection assembly 17. The leading edge high lift body 15 in the present embodiment is a slat. The connection assembly 17 is configured for connecting the leading edge high lift body 15 to the leading edge of the main wing 11 in such a way that the leading edge high lift body 15 is movable relative to the main wing 11 between a retracted position and at least one extended position.

The connection assembly 17 comprises a first connection element 19 and a second connection element 21. The first connection element 19 is movably mounted to the main wing 11 and is fixedly mounted to the leading edge high lift body 15. The second connection element 21 is movably mounted to the main wing 5 and is fixedly mounted to the leading edge high lift body 15 in a position spaced apart from the first connection element 19 in a wing span direction 23.

Further, the connection assembly 17 comprises a drive system 25 that is fixedly mounted to the main wing 11 and that is connected to the leading edge high lift body 15 for driving the leading edge high lift body 15 between the retracted position and the extended position. The drive system 25 comprises a first drive unit 27 and a second drive unit 29 spaced apart from one another in the wing span direction 23. The first drive unit 27 is formed as a geared rotary actuator (GRA) and has a first input section 31 coupled to a drive shaft 33, a first gear unit 35, and a first output section 37 drivingly coupled to the first connection element 19. The second drive unit 29 is formed as a geared rotary actuator (GRA) and has a second input section 39 coupled to the drive shaft 33, a second gear unit 41, and a second output section 43 drivingly coupled to the second connection element 21. The first and second gear units 35, 41 transform high rotational speed with low torque from the first and second input sections 31, 39, i.e. from the drive shaft 33, into low rotational speed with high torque at the first and second output sections 37, 43. The first output section 37 comprises a first output wheel 45 and the second output section 43 comprises a second output wheel 47.

The first connection element 19 is formed as a first track 20 that is movably guided at the main wing 11 and that is fixedly mounted to the leading edge high lift body 15. The first output wheel 45 is formed as a first pinion 49 drivingly engaging a first toothed rack 51 at the surface of the first track 20. Additionally, the second connection element 21 is formed as a second track 22 that is movably guided at the main wing 11 and that is fixedly mounted to the leading edge high lift body 15. The second output wheel 47 is formed as a second pinion 53 drivingly engaging a second toothed rack 55 at the surface of the first track 20. The first track 20 and the second track 22 are in the form of a slat track, i.e. in the form of an elongate support beam that is movable along the direction of its elongate extension.

The drive system 25 comprises a sync arrangement 57 coupling the first output section 37 to the second output section 43 for sync movement of the first and second output sections 37, 43. The sync arrangement 57 comprises a first sync wheel 59, a second sync wheel 61, and a sync shaft 63 fixedly and rigidly connecting the first sync wheel 59 to the second sync wheel 61, such that the sync shaft 63 extends coaxially with a sync axis 65 about which the first and second sync wheels 59, 61 as well as the sync shaft 63 rotate. The first sync wheel 59 is configured to engage the first output wheel 45, and the second sync wheel 61 is configured to engage the second output wheel 47.

The first output wheel 45 and the first sync wheel 59 are formed in the way of a first stepping gear 60 translating a continuous rotation of the first output wheel 45 into an intermittent rotation of the first sync wheel 59. Additionally, the second output wheel 47 and the second sync wheel 61 are formed in the way of a second stepping gear 62 translating a continuous rotation of the second output wheel 47 into an intermittent rotation of the second sync wheel 61. The first stepping gear 60 and the second stepping gear 62 are formed in the way of a Geneva drive.

This means, the first output wheel 45 comprises two projections 67 in the form of pins projecting from an axial surface of the first output wheel 45 in parallel to an axis of rotation 69 of the first output wheel 45 and spaced from one another by 180° about an axis of rotation 69 of the first output wheel 45. Additionally, the second output wheel 47 comprises two projections 68 in the form of pins projecting from an axial surface of the second output wheel 47 in parallel to an axis of rotation 70 of the second output wheel 47 and spaced from one another by 180° about an axis of rotation 70 of the second output wheel 47.

Likewise, the first sync wheel 59 comprises two radial recesses 71 in the form of slots which are spaced from one another by 180° about the sync axis 65, and which are formed to receive and meshingly engage with the projections 67 of the first output wheel 45. Additionally, the second sync wheel 61 comprises two radial recesses 72 in the form of slots which are spaced from one another by 180° about the sync axis 65, and which are formed to receive and meshingly engage with the projections 68 of the second output wheel 47.

The projections 67 of the first output wheel 45 are arranged offset by 90° relative to the projections 68 of the second output wheel 47, with respect to the axis of rotation 69 of the first output wheel 45 and/or the axis of rotation 70 of the second output wheel 47. Additionally, the recesses 71 of the first sync wheel 59 are arranged offset by 90° relative to the recesses 72 of the second sync wheel 61, with respect to the sync axis 65.

The drive system 33 is configured such that during continuous and synchronous rotation of the first and second output wheels 45, 47 alternatingly a) one of the projections 67 of the first output wheel 45 engages one of the recesses 71 of the first sync wheel 59, rotates the first sync 59 wheel by 90°, and then disengages from the said recess 71 of the first sync wheel 59, and b) one of the projections 68 of the second output wheel 47 engages one of the recesses 72 of the second sync wheel 61, rotates the second sync wheel 61 by 90°, and then disengages from the said recess 72 of the second sync wheel 61, when the first and second output wheels 45, 47 rotate synchronously. This function of the first and second stepper gears 60, 62 is schematically illustrated in FIG. 3, where in FIG. 3a) the first stepper gear 60 is shown in a first state A, in FIG. 3b) the second stepper gear 62 is shown in the first state A, in FIG. 3c) the first stepper gear 60 is shown in a second state B, and in FIG. 3d) the second stepper gear 62 is shown in the second state B.

Upon asynchronous rotation of the first and second output wheels 45, 47 a) one of the projections 67 of the first output wheel 45 runs against the surface of the first sync wheel 59 without properly engaging one of the recesses 71 of the first sync wheel 59, thereby blocking or obstructing rotation of the first output wheel 45, and/or b) one of the projections 68 of the second output wheel 47 runs against the surface of the second sync wheel 61 without properly engaging one of the recesses 72 of the second sync wheel 61, thereby blocking or obstructing rotation of the second output wheel 47.

The first drive unit 27 further comprises a first torque limiter device 73 configured to stop rotation of the first output wheel 45 upon detection of a fail state. Additionally, the second drive unit 29 comprises a second torque limiter device 75 configured to stop rotation of the second output wheel 47 upon detection of a fail state. The first torque limiter device 73 is configured to detect a fail state when a threshold transverse force at the sync shaft 63 is exceeded. Additionally, the second torque limiter device 75 is configured to detect a fail state when a threshold transverse force at the sync shaft 63 is exceeded. The threshold transverse force relates to a force transverse to the sync axis 65.

The sync shaft 63 is rotatably supported at a first housing 81 of the first drive unit 27 and is connected to a first transverse force sensor 83 for triggering the first torque limiter device 73. The first torque limiter device 73 is arranged inside the first housing 81 and is connected to the first transverse force sensor 83 through the first housing 81. Additionally, the sync shaft 63 is rotatably supported at a second housing 85 of the first drive unit 27 and is connected to a second transverse force sensor 87 for triggering the second torque limiter device 75. The second torque limiter device 75 is arranged inside the second housing 85 and is connected to the second transverse force sensor 87 through the second housing 85.

By a wing 5 with a sync arrangement 57 as described above skew cases of the leading edge high lift body 15 can be efficiently detected and prevented.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

The invention claimed is:

1. A wing for an aircraft, comprising
a main wing,
a leading edge high lift assembly comprising
a leading edge high lift body, and
a connection assembly movably connecting the leading edge high lift body to the main wing, such that the leading edge high lift body can be moved between a retracted position and at least one extended position,
wherein the connection assembly comprises a first connection element and a second connection element,
wherein the first connection element is movably mounted to the main wing and is mounted to the leading edge high lift body, and
wherein the second connection element is movably mounted to the main wing and is mounted to the leading edge high lift body in a position spaced apart from the first connection element in a wing span direction,
wherein the connection assembly comprises a drive system that is mounted to the main wing and connected to the leading edge high lift body for driving the leading edge high lift body between the retracted position and the extended position,
wherein the drive system comprises a first drive unit and a second drive unit spaced apart from one another in the wing span direction,
wherein the first drive unit has a first input section coupled to a drive shaft, a first gear unit and a first output section coupled to the first connection element, and
wherein the second drive unit has a second input section coupled to the drive shaft, a second gear unit, and a second output section coupled to the second connection element,
wherein the first output section comprises a first output wheel and the second output section comprises a second output wheel,
wherein the drive system comprises a sync arrangement coupling the first output section to the second output section for sync movement of the first and second output sections,
the sync arrangement comprises a first sync wheel, a second sync wheel, and a sync shaft fixedly connecting the first sync wheel to the second sync wheel,
the first sync wheel is configured to be driven by the first output wheel and the second sync wheel is configured to be driven by the second output wheel,
wherein the first sync wheel is configured to engage the first output wheel and the second sync wheel is configured to engage the second output wheel, when the first and second output wheels rotate synchronously,
while the first sync wheel is configured to disengage from the first output wheel and/or the second sync wheel is configured to disengaged from the second output wheel, when the first and second output wheels rotate asynchronously.

2. The wing according to claim 1, wherein the drive system is configured such that alternatingly a) the first sync wheel is engaged and rotated by the first output wheel by a predefined angular range and b) the second sync wheel is engaged and rotated by the second output wheel by the predefined angular range, when the first and second output wheels rotate synchronously.

3. The wing according to claim 2, wherein the predefined angular range is between 80° and 100°.

4. The wing according to claim 1, wherein the first output wheel and the first sync wheel are formed in the way of a first stepping gear translating a continuous rotation of the first output wheel into an intermittent rotation of the first sync wheel, and/or
wherein the second output wheel and the second sync wheel are formed in the way of a second stepping gear translating a continuous rotation of the second output wheel into an intermittent rotation of the second sync wheel.

5. The wing according to claim 4, wherein the first stepping gear and/or the second stepping gear is in the form of a Geneva drive.

6. The wing according to claim 4, wherein the first output wheel comprises two projections projecting from an axial surface of the first output wheel in parallel to an axis of rotation of the first output wheel and spaced from one another by 180°, and/or
wherein the second output wheel comprises two projections projecting from an axial surface of the second output wheel in parallel to an axis of rotation of the second output wheel and spaced from one another by 180°.

7. The wing according to claim 6, wherein the first sync wheel comprises two radial recesses spaced from one another by 180° and formed to receive the projections of the first output wheel, and/or
wherein the second sync wheel comprises two radial recesses spaced from one another by 180° and formed to receive the projections of the second output wheel.

8. The wing according to claim 7, wherein the projections of the first output wheel are arranged offset by 90° relative to the projections of the second output wheel, and/or
wherein the recesses of the first sync wheel are arranged offset by 90° relative to the recesses of the second sync wheel.

9. The wing according to claim 8, wherein the drive system is configured such that during synchronous rotation of the first and second output wheels alternatingly a) one of the projections of the first output wheel engages one of the recesses of the first sync wheel, rotates the first sync wheel by 90°, and then disengages from the said recess of the first sync wheel, and b) one of the projections of the second output wheel engages one of the recesses of the second sync wheel, rotates the second sync wheel by 90°, and then disengages from the said recess of the second sync wheel, when the first and second output wheels rotate synchronously, while upon asynchronous rotation of the first and second output wheels a) one of the projections of the first output wheel runs against the first sync wheel without properly engaging one of the recesses of the first sync wheel, thereby blocking or obstructing rotation of the first output wheel, and/or b) one of the projections of the second output wheel runs against the second sync wheel without properly engaging one of the recesses of the second sync wheel, thereby blocking or obstructing rotation of the second output wheel.

10. The wing according to claim 9, wherein the first drive unit comprises a first torque limiter device configured to stop rotation of the first output wheel upon detection of a fail state, and/or
wherein the second drive unit comprises a second torque limiter device configured to stop rotation of the second output wheel upon detection of a fail state.

11. The wing according to claim 10, wherein the first torque limiter device is configured to detect a fail state when a threshold torque at the first output wheel or within the first gear unit is exceeded, and/or
wherein the second torque limiter device is configured to detect a fail state when a threshold torque at the second output wheel or within the second gear unit is exceeded.

12. The wing according to claim 10, wherein the first torque limiter device is configured to detect a fail state when a threshold transverse force at the first sync wheel or at the sync shaft is exceeded, and/or
wherein the second torque limiter device is configured to detect a fail state when a threshold transverse force at the second sync wheel or at the sync shaft is exceeded.

13. The wing according to claim 12, wherein the sync shaft is rotatably supported at a first housing of the first drive unit and is connected to a first transverse force sensor, and
wherein the first torque limiter device is arranged inside the first housing and is connected to the first transverse force sensor through the first housing, and/or
wherein the sync shaft is rotatably supported at a second housing of the first drive unit and is connected to a second transverse force sensor, and
wherein the second torque limiter device is arranged inside the second housing and is connected to the second transverse force sensor through the second housing.

14. The wing according to claim 1, wherein the first connection element is formed as a first track that is movably guided at the main wing and that is mounted to the leading edge high lift body, and
wherein the first output wheel is formed as a first pinion drivingly engaging a first toothed rack at the first track, and/or wherein the second connection element is formed as a second track that is movably guided at the main wing and that is mounted to the leading edge high lift body, and
wherein the second output wheel is formed as a second pinion drivingly engaging a second toothed rack at the second track.

15. The wing according to claim 1, wherein the connection assembly comprises one or more further connection elements in the form of a track or in the form of a linkage.

16. A leading edge high lift assembly for the wing according to claim 1, comprising:
the leading edge high lift body, and
the connection assembly for movably connecting the leading edge high lift body to a main wing, such that the leading edge high lift body can be moved between a retracted position and at least one extended position,
wherein the connection assembly comprises the first connection element and the second connection element,
wherein the first connection element is configured to be movably mounted to the main wing and is mounted to the leading edge high lift body, and
wherein the second connection element is configured to be movably mounted to the main wing and is mounted to the leading edge high lift body in a position spaced apart from the first connection element in a wing span direction,
wherein the connection assembly comprises the drive system that is configured to be mounted to the main wing and that is connected to the leading edge high lift body for driving the leading edge high lift body between the retracted position and the extended position,
wherein the drive system comprises the first drive unit and the second drive unit spaced apart from one another in the wing span direction,
wherein the first drive unit has the first input section coupled to the drive shaft, the first gear unit and the first output section coupled to the first connection element, and
wherein the second drive unit has the second input section coupled to the drive shaft, the second gear unit, and the second output section coupled to the second connection element,
wherein the first output section comprises the first output wheel and the second output section comprises the second output wheel,
wherein the drive system comprises the sync arrangement coupling the first output section to the second output section for sync movement of the first and second output sections,
the sync arrangement comprises the first sync wheel, the second sync wheel, and the sync shaft fixedly connecting the first sync wheel to the second sync wheel,
the first sync wheel is configured to engage the first output wheel and the second sync wheel is configured to engage the second output wheel.

17. An aircraft comprising a leading edge high lift assembly according to claim 16.

18. An aircraft comprising a wing according to claim 1.

* * * * *